United States Patent
Lee et al.

(10) Patent No.: US 7,135,536 B2
(45) Date of Patent: Nov. 14, 2006

(54) PRODUCTION METHOD OF POLYISOCYANATE BY END CAPPING WITH ACYL CHLORIDE

(75) Inventors: Jae-Suk Lee, Gwangju (KR); Chan Hee Jung, Jeollanam-Do (KR); Sang-Yoon Park, Gwangju (KR); Guttikonda Yogendra Nath, Gwangju (KR); Shashahar Samal, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 68 days.

(21) Appl. No.: 10/985,678

(22) Filed: Nov. 11, 2004

(65) Prior Publication Data

US 2005/0209426 A1 Sep. 22, 2005

(30) Foreign Application Priority Data

Mar. 16, 2004 (KR) .................... 10-2004-0017661

(51) Int. Cl.
*C08G 18/71* (2006.01)
(52) U.S. Cl. ......................................... 528/69; 525/452
(58) Field of Classification Search ................. 528/69; 525/452
See application file for complete search history.

(56) References Cited

OTHER PUBLICATIONS

Patten, Timothy E. and Novak, Bruce M.; Living Organotitanium (IV)-Catalyzed Polymerizations of Isocyanates; *J. AM. Chem. Soc.* 1996, 118, pp. 1906-1916.

Se, Kazunori; Aoyama, Kouji; Aoyama, Jun; Donkai, Masaru; "Introduction of Azobenzenes or Vinyl Groups into Ends of Rodlike Polymers", *Macromolecules* 2003, 36, pp. 5878-5881.

Gu, Hong; Nakamura, Yo; Sato, Takahiro; Teramoto, Akio; Green, Mark M.; Jha, Salil K.; Andreola, Christopher; Reidy, Michael P.; "Optical Rotation of Random Copolyisocyanates of Chiral and Achiral Monomers: Sergeant and Soldier Copolymers"; *Macromolecules* 1998, 31, pp. 6362-6368.

Ute, Koichi; Asai, Toshiya; Fukunishi, Yoichi; Hatada, Koichi, "Stabilization of Oligo(butyl isocyanate) by Acetyl End-Capping", *Polymer Journal*, vol. 27, No. 4, pp. 445-448 (1995).

*Primary Examiner*—Rachel Gorr
(74) *Attorney, Agent, or Firm*—Frommer Lawrence & Haug LLP; Ronald R. Santucci

(57) ABSTRACT

The present invention relates to a polymerization method of polyisocyanates endcapped with acyl chlorides, and more particularly to a process for preparing polyisocyanate with higher stability comprising endcapping a living polymer chain amidate anion with an acyl chloride derivative in the presence of an amine catalyst, thereby enabling to maximize endcapping ratios.

10 Claims, 3 Drawing Sheets

PRODUCTION METHOD OF POLYISOCYANATE BY END CAPPING WITH ACYL CHLORIDE

CROSS-REFERENCE TO RELATED APPLICATIONS

This application claims priority of Korean Application No. 10-2004-0017661, filed on Mar. 16, 2004, the disclosure of which is incorporated fully herein by reference.

BACKGROUND OF THE INVENTION

1. Field of the Invention

The present invention relates to a polymerization method of polyisocyanates endcapped with acyl chlorides, and more particularly to a process for preparing polyisocyanate with higher stability comprising endcapping a living polymer chain amidate anion with an acyl chloride derivative in the presence of an amine catalyst, thereby maximizing endcapping ratios.

2. Description of the Related Art

Polyisocyanates are polymers having rigid bonding due to their partial double bonds of amide linkages in the main backbone. In addition, polyisocyanates adopt a helical conformation in a solution as well as in a crystalline state due to their steric hindrance. Their left-handed helices and right-handed helices are homogeneously arranged and therefore provide a similar conformation to biomacromolecules with helical conformation such as nucleic acids and proteins, while polyisocyanates have racemic properties. Asymmetric carbons are introduced into side chains of polyisocyanates to render helical conformation to be in one screw sense for inducing optical activity according to the rule of sergeant and soldier(Akio Teramoto, *Macromolecules* 1998, 31, 6362–6368), and such helically chiral polyisocyanates are highlighted in view of their application. However, polyisocyanates generally exhibit low ceiling temperature and are susceptible to depolymerization due to their terminal NH group, which decreases the applicability of polyisocyanate to the industrial field. In this regard, for enhancing stability, Drs. Novak and Hatada have reported a method for stabilizing polyisocyanates by coordination polymerization using acetic anhydride derivatives and acetic chloride derivatives as endcapping materials (Patten, T. E.; Novak, B. M. *J. Am. Chem. Soc.* 1996, 118, 1906, Ute, K.; Hatada, K. Polym. J. 1995, 27, 445). Moreover, Dr. Masaru has suggested a method for endcapping by use of methacryloyl chloride having functionalities for coupling reaction with the end of living anion chain (Kazunori Se, Masaru, D. *Macromolecules* 2003, 36, 5878). However, the endcapping efficiency was 10–77% due to lower reactivity of living polymer chain amidate anion and thus a complete level of stability was not achieved because complete endcapping was not possible. Accordingly, there still remains a need for developing a novel approach to endcap polyisocyanate having higher efficiency as well as to increase stability and impose characteristics for functional materials.

SUMMARY OF THE INVENTION

The present inventors have made extensive researches to develop a novel process for maximizing endcapping ratios of living polymer chain amidate anion, and as a result discovered that acyl chloride derivatives as endcapping materials together with amine catalyst could dramatically improve the endcapping ratio.

Accordingly, it is an object of this invention to provide a process for polymerizing polyisocyanates capable of increasing an endcapping ratio to no less than 90%.

BRIEF DESCRIPTION OF THE DRAWINGS

The aforementioned aspects and other features of the present invention will be explained in the following description, taken in conjunction with the accompanying drawings, wherein.

DESCRIPTIONS FOR SYMBOLS IN DRAWINGS

Figure 1:
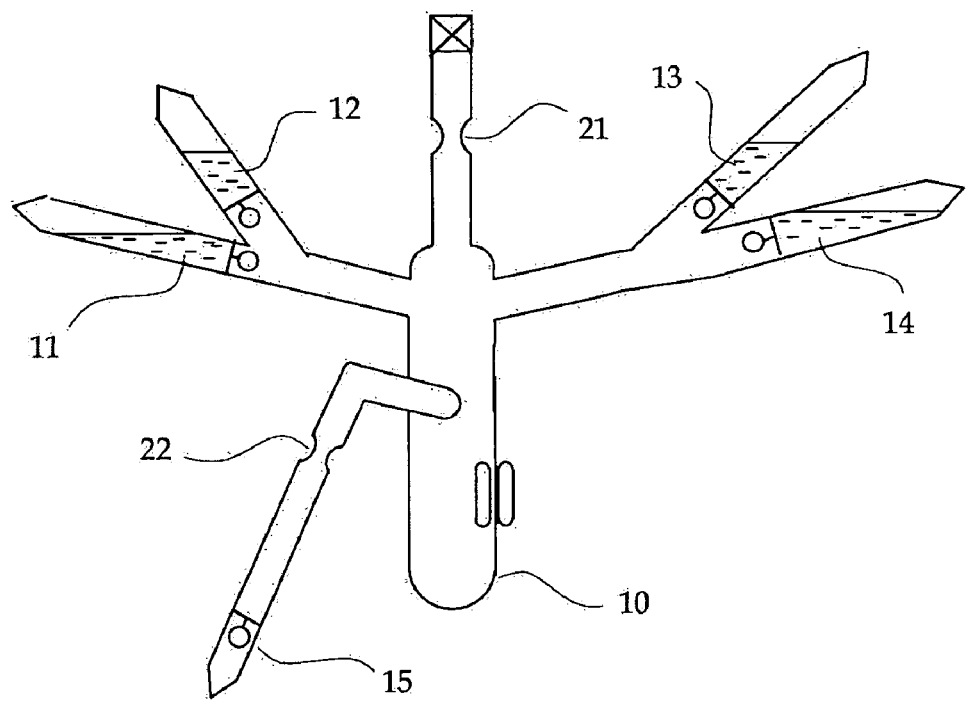
FIG. 1 schematically represents an apparatus for anion polymerization of isocyanate used in the endcapping reaction of the present invention.

10: main reactor
11: isocyanate monomer-containing ampoule
12: washing solution-containing ampoule
13: initiator-containing ampule
14: ampoule containing endcapping material and amine catalyst
15: tube for recovering washing solution
21, 22: section portion

DETAILED DESCRIPTION OF THIS INVENTION

In one aspect of this invention, there is provided a process for polymerizing polyisocyanate comprising endcapping a living polymer chain amidate anion generated in the course of an anion polymerization of an isocyanate monomer, the improvement comprising endcapping a living polymer chain amidate anion with an acyl chloride derivative in the presence of an amine catalyst.

The present invention will be described in more detail hereunder:

Since living polymer chain amidate anions generated during polymerization are susceptible to depolymerization, polyisocyanates having various industrial applications are required to increase stability. While methods for endcapping amidate anion have been generally applied for enhancing stability, the conventional methods showed a relatively low endcapping ratio and therefore were not able to achieve a complete stability. In addition, Drs. Novak and Hatada have suggested acetic anhydride derivatives and acetic chloride derivatives as endcapping materials; however, they employed a coordination polymerization and did not teach the use of catalyst. Dr. Masaru has prepared polyisocyanates using methacryloyl chloride as endcapping materials according to anion polymerization, showing lower endcapping ratio of 10–77% due to the absence of catalysts.

In contrast, the present invention adopts an anion polymerization capable of conveniently controlling molecular weight and synthesizing monodisperse polymer and selectively employs acyl chloride derivatives for endcapping living polymer chain amidate anion generated during polymerization together wit the use of amine catalyst, thereby maximizing an endcapping ratio of more than 90%. The most prominent advantage of the present invention lies in the accomplishment of the polymerization of polyisocyanates with maximized capping ratio, which cannot be found in any publications published so far.

The acyl chloride used in this invention for endcapping is represented by the following Formula 1:

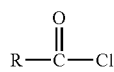

(1)

wherein R is a straight or branched saturated or unsaturated alkyl group, or an alkyl group including a carbonyl group.

Furthermore, the acyl chloride is a racemic compound or an optically active compound. In the case that an optically active acyl chloride is employed for endcapping, polyisocyanate with controlled orientation in helical conformation according to the rule of sergeant and soldier can be polymerized. The optically active polyisocyanates may be used as a recognition material in a high-performance liquid chromatography (HPLC) and applied to optical switch device, nanomaterials and biomaterials.

In addition, in the case that acyl chloride derivatives with reactive group such as vinyl group capable of radical polymerization are used, macromonomer can be synthesized through polymerization and it may be undergone graft polymerization via radical polymerization. Therefore, acyl chlorides having various functional groups introduced permit the preparation of novel polymers.

The particular illustration of acyl chloride derivative represented by formula 1 includes methacryloyl chloride, 2-chloropropane chloride, (s)-(−)acetopropionyl chloride and suberoyl chloride.

The amine catalyst used together with endcapping material may be aliphatic or aromatic amine compound. The aliphatic amine includes mono-, di- or tri-alkyl amine compounds, more particularly, including triethyl amine. The representative of the aromatic amine is pyridine. It is preferred that the amine catalyst is used at 1.5–3.0 mole ratio to a capping material.

The polymerization of polyisocyanate according to the present invention is schematically represented as the following Scheme 1:

[Scheme 1]

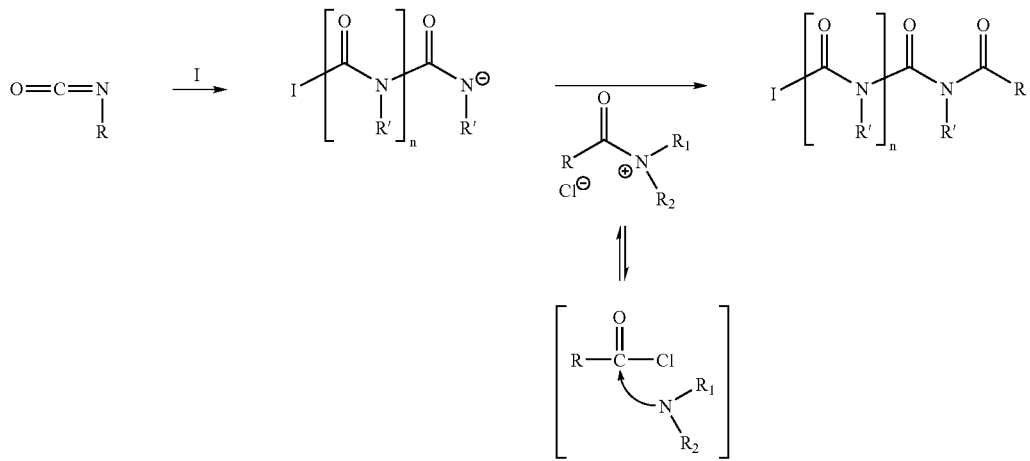

wherein R is the same as Formula, R' is aliphatic or aromatic hydrocarbon group including alkyl, silyl, ethoxy and phenyl groups, $R_1$ and $R_2$ is individually an alkyl group or form an aromatic ring when combined with each other and I is an initiator.

The anion polymerization of isocyanate monomer adopted in the present invention is a conventional one and therefore the descriptions for isocyante monomer, polymerization initiator, polymerization solvent and other linked matters may be made in accordance with the conventional anion polymerization.

The process for polymerization of Scheme 1 will be described in more details as follows:

The anion polymerization of this invention is performed under high vacuum ($10^{-3}$–$10^{-6}$Torr) at low temperature (−30~−100□) using a glass apparatus equipped with ampules containing reactants such as an initiator, a monomer, an endcapping material and amine catalyst depicted in FIG. 1. The polymerization is carried out in accordance with procedures of the conventional anion polymerization.

Tetrahydrofuran is used as a solvent and sodium benzylanillide is used as an initiator. As shown in the polymerization apparatus of FIG. 2, the ampule containing an initiator is broken out with an intrinsic magnet and introduced into a reaction flask. Then, the initiator solution is allowed to reach an equilibrium with polymerization temperature. Isocyanate monomers are introduced into the reaction flask containing the initiator and the polymerization is performed for 30 min–2 hr, preferably for 1 hr. Acyl chloride as endcapping materials and amine catalyst are introduced into the reaction flask as the above and endcapping is carried out for tens minutes. The polymer thus obtained is precipitated with excess methanol and recovered.

As described previously, the present polymerization maximizes an endcapping ratio to reach no less than 90%.

pyridine catalyst was connected to vacuum line and then separated isolated from the vacuum line by sealing under high vacuum and nitrogen atmosphere. The inner portion of the polymerization apparatus was rinsed once with washing solution and the ampule containing initiator was broken out on the methanol thermostat to introduce into the polymerization apparatus. After the accomplishment of temperature equilibrium between the inner portion of reactor and reactors, monomers were introduced to proceed with polymerization for 60 min. Then, pyridine and optical active methacryloyl chloride were introduced to undertake the endcapping reaction for 10 min. The polymers thus obtained were precipitated and filtered followed by vacuum-drying or freeze-drying.

TABLE 1

| Run | Reactant (mmol) | | | | Time (min) | Number average molecular weight (Mn) | | | Endcapping ratio (%)[d] | Polydispersity (Mw/Mn) | Yield (%) |
|---|---|---|---|---|---|---|---|---|---|---|---|
| | Na—Ba | HIC | MAC | pyrinde | | Cal.[a] | Mea.[b] | Mea.[c] | | | |
| 1 | 0.10 | 4.04 | 0.81 | 1.75 | 60 | 5,000 | 5,500 | 5,600 | 101 | 1.07 | 100 |
| 2 | 0.11 | 6.20 | 0.62 | 1.60 | 60 | 7,000 | 7,000 | 6,900 | 98 | 1.13 | 100 |
| 3 | 0.07 | 6.76 | 0.65 | 1.44 | 60 | 12,500 | 13,000 | 12,800 | 98 | 1.14 | 100 |
| 4 | 0.05 | 6.71 | 0.53 | 1.58 | 60 | 15,500 | 16,000 | 15,700 | 98 | 1.17 | 100 |

[a]calculated number-average molecular weight = ([HIC]/[Na—Ba] × HIC molecular weight) + molecular weight of MAC and Na—Ba

[b]measured molecular weight (Mn or Mw) was analyzed using SEC-LS in THF at 40□.

[c]measured molecular weight obtained from integration ratios of $^1$H NMR spectrum

[d]endcapping ratio (%) = (molecular weight measured with $^1$H NMR)/(molecular weight measured with SEC-LS) × 100

The following specific examples are intended to be illustrative of the invention and they should not be construed as limiting the scope of the invention as defined by appended claims.

EXAMPLE 1

Figure 2:
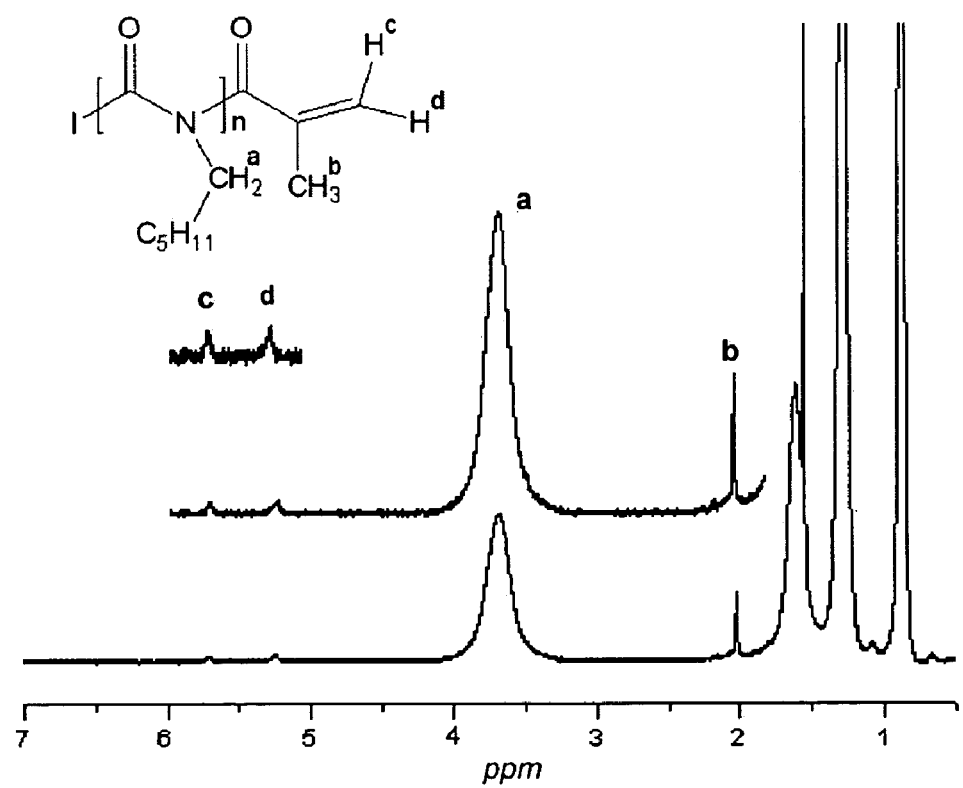
FIG. 2 is $^1$H-NMR spectrum of methacryloyl chloride-endcapped poly(n-hexylisocyanate)

Anion Polymerization of Poly(n-hexylisocyanate) Endcapped with Methacryloyl Chloride HIC (n-hexylisocyante) was used as a monomer the reactions were carried out under high vacuum ($10^{-6}$ Torr) at temperature of −98□. Tetrahydrofuran was used as a solvent. The reaction time schedule was adjusted to perform polymerization for 50 min and endcap for 10 min. The reaction temperature of −98□ was prepared by charging a methanol thermostat with liquid nitrogen and the bath temperature was checked using a low temperature thermometer. An initiator of the reaction, sodium benzylanillide (Na—BA), was an anion compound prepared by the reaction of sodium metal and benzyl aniline in distilled tetrahydrofuran. Sodium benzylanillide (Na—BA) thus obtained was immediately stored in a glass ampoule under vacuum and diluted to an appropriate concentration. An apparatus for polymerization containing glass ampule with purified monomer, initiator, methacryloyl chloride (MAC) for endcapping and FIG. 2 shows $^1$H NMR analysis spectra of methacryloyl chloride-endcapped poly(n-hexylisocyanate). According to the spectra of FIG. 2, the peaks of methyl group of methylmethacrylate and hydrogen of methylene appeared at 2.02 ppm, 5.25 ppm and 5.71 ppm, respectively. The analyses demonstrated that the terminal of polymer chain successfully altered to methylmethacryloyl group. The molecular weight calculated by NMR analysis (5,700) was substantially identical to that calculated by SEC-LS (5,500), demonstrating that the endcapping was successfully accomplished.

EXAMPLE 2

Anion Polymerization of Poly(n-hexylisocyanate) Endcapped with (s)-(−)acetopropionyl Chloride n-Hexylisocyante was polymerized in the same manner as Example 1 except for reaction time. Afterwards, pyridine catalyst and optically active (s)-(−)acetopropionyl chloride ((s)-APC) were introduced and undergone endcapping for 10 min. The polymer thus obtained was precipitated using methanol and filtered followed by vacuum-drying or freeze-drying.

TABLE 2

| | Reactant (mmol) | | | | Time (min[c]/min[d]) | Number average molecular weight (Mn) | | | Endcapping ratio (%)[g] | Polydispersity (Mw/Mn) | Yield (%) |
|---|---|---|---|---|---|---|---|---|---|---|---|
| Run | Na—Ba | HIC | (s)-APC[e] | pyrinde | | Cal.[a] | Mea.[b] | Mea.[c] | | | |
| 1 | 0.66 | 3.47 | 1.64 | 5.10 | 50/10 | 3500 | 3500 | 3600 | 102 | 1.13 | 98 |
| 2 | 0.63 | 4.65 | 1.38 | 4.11 | 50/10 | 4500 | 4900 | 4600 | 93 | 1.18 | 99 |
| 3 | 0.38 | 4.06 | 1.31 | 3.35 | 50/10 | 7100 | 6500 | 6400 | 98 | 1.07 | 99 |

[a]calculated number-average molecular weight = ([HIC]/[Na—Ba] × HIC molecular weight) + molecular weight of (s)-APC and Na—Ba
[b]measured molecular weight (Mn or Mw) was analyzed using SEC-LS in THF at 40□.
[c]polymerization time
[d]endcapping time
[e][a]$^{20}$D = −31°
[f]measured molecular weight obtained from integration ratios of $^1$H NMR spectrum
[d]endcapping ratio (%) = (molecular weight measured with $^1$H NMR)/(molecular weight measured with SEC-LS) × 100

Figure 3:
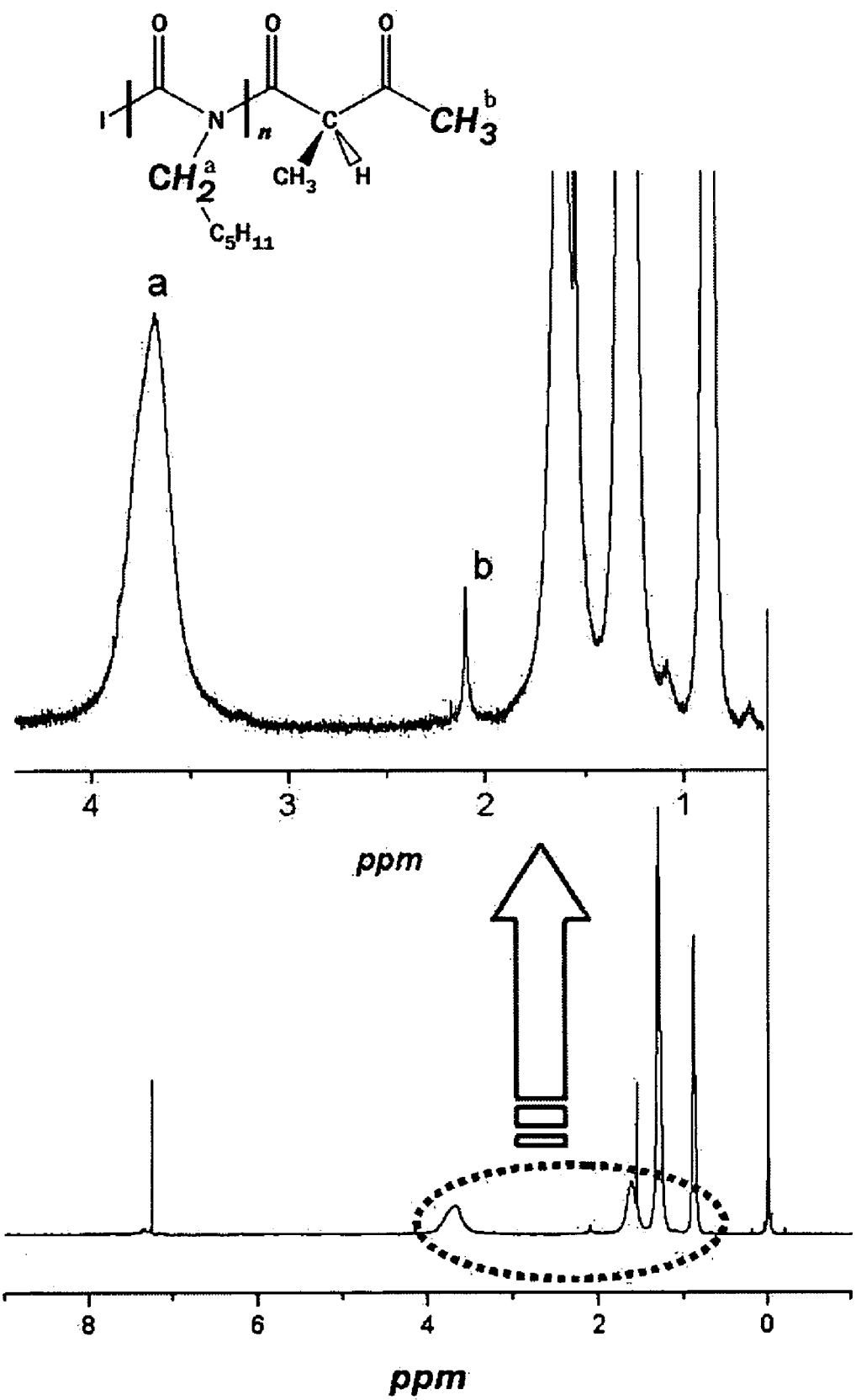
FIG. 3 is $^1$H-NMR spectrum of (s)-(−)acetopropionyl chloride-endcapped poly(n-hexylisocyanate)
Figure 4:
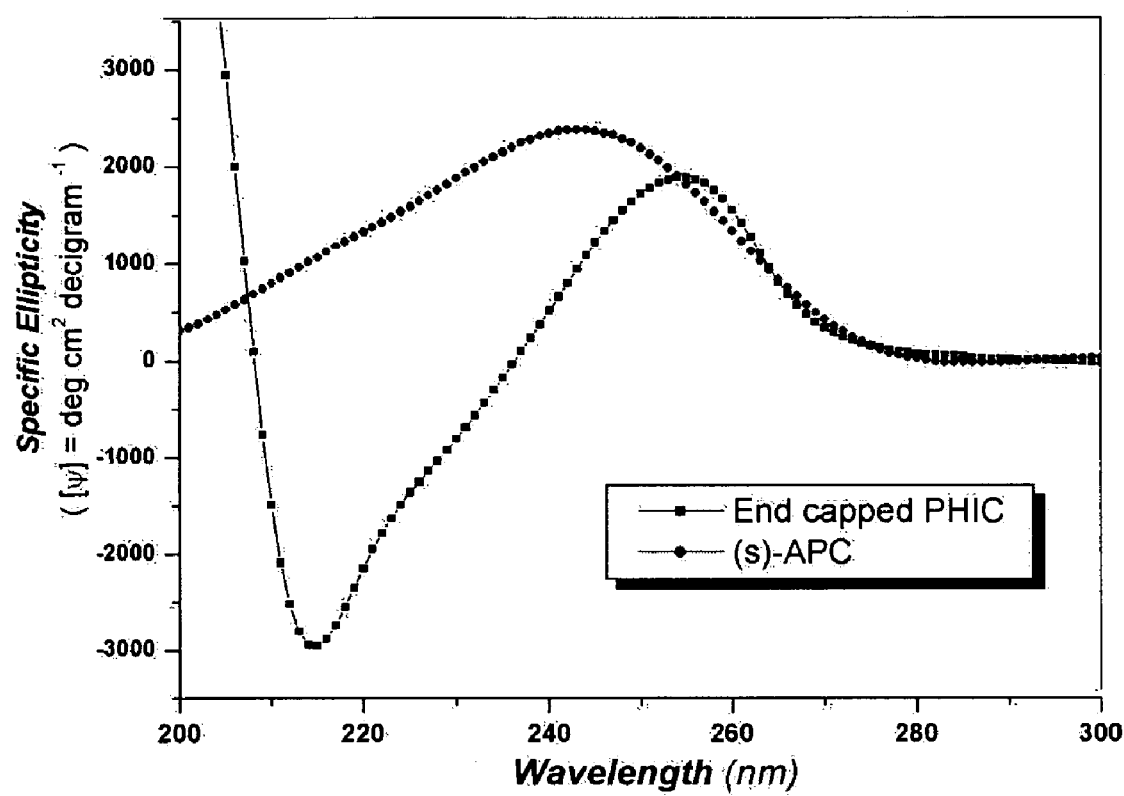
FIG. 4 is circular dichromism spectrum of (s)-(−)acetopropionyl chloride-endcapped poly(n-hexylisocyanate).

FIG. 3 shows $^1$H NMR analysis spectra of (s)-(−)acetopropionyl chloride-endcapped poly(n-hexylisocyanate). The peak corresponding to methyl group attached to the terminal of (s)-(−)acetopropionyl chloride-endcapped poly(n-hexylisocyanate), which was not shown for non-endcapped poly(n-hexylisocyanate), was observed at 2.2 ppm as represented in FIG. 3. The molecular weight calculated by NMR analysis (4600) was substantially identical to that calculated by SEC-LS (4900), demonstrating that the endcapping was quantitatively accomplished. Furthermore, FIG. 4 represents circular dichromism spectrum analysis for (s)-(−)acetopropionyl chloride-endcapped poly(n-hexylisocyanate). As a result, the peaks of molar ellipticity were observed at 290–220 nm, demonstrating that the optical activity was introduced into poly(n-hexylisocyanate). Therefore, it could be recognized that the endcapping was successfully accomplished.

The present process allows to stabilize polyisocyanates through endcapping and enable the synthesis of block polymers such as isoprene, thereby resulting in the application to industrial processes. The optically active polyisocyanate can be prepared by use of optically active endcapping materials, being applicable to recognition materials in a high-performance liquid chromatography and optical materials such as optical switch.

While the foregoing description represents various embodiments of the present invention, it will be appreciated that the foregoing description should not be deemed limiting since additions, variations, modifications and substitutions may be made without departing from the spirit and scope of the present invention. It will be clear to one of skill in the art that the present invention may be embodied in other forms, structures, arrangements, and proportions, and may use other elements, materials and components. The present disclosed embodiments are, therefore, to be considered in all respects as illustrative and not restrictive, the scope of the invention being indicated by the appended claims and not limited to the foregoing description.

What is claimed is:

1. A process for polymerizing polyisocyanate comprising endcapping a living polymer chain amidate anion generated in the course of an anion polymerization of an isocyanate monomer, wherein the improvement comprising endcapping a living polymer chain amidate anion with an acyl chloride derivative in the presence of an amine catalyst.

2. The process according to claim 1, wherein said acyl chloride derivative is represented by the following Formula 1:

(1)

wherein R is a straight or branched saturated or unsaturated alkyl group, or an alkyl group including a carbonyl group.

3. The process according to claim 1, wherein said acyl chloride derivative is a racemic compound or an optically active compound.

4. The process according to claim 1, wherein said acyl chloride derivative is methacryloyl chloride, (s)-(−)acetopropionyl chloride or suberoyl chloride.

5. The process according to claim 1, wherein said amine catalyst is triethyl amine or pyridine.

6. The process according to claim 1, wherein an endcapping ratio with acyl chloride derivative is no less than 90%.

7. The process according to claim 2, wherein an endcapping ratio with acyl chloride derivative is no less than 90%.

8. The process according to claim 3, wherein an endcapping ratio with acyl chloride derivative is no less than 90%.

9. The process according to claim 4, wherein an endcapping ratio with acyl chloride derivative is no less than 90%.

10. The process according to claim 5, wherein an endcapping ratio with acyl chloride derivative is no less than 90%.

* * * * *